United States Patent [19]
Kim

[11] Patent Number: 6,097,226
[45] Date of Patent: Aug. 1, 2000

[54] POWER NOISE PREVENTING CIRCUIT FOR MICROCONTROLLER UNIT (MCU)

[75] Inventor: Ho Hyun Kim, Choongcheongbuk-Do, Rep. of Korea

[73] Assignee: LG Semicon Co., Ltd., Cheongju, Rep. of Korea

[21] Appl. No.: 09/141,422

[22] Filed: Aug. 27, 1998

[30] Foreign Application Priority Data

Jan. 23, 1998 [KR] Rep. of Korea ......................... 98/2014

[51] Int. Cl.⁷ ....................................................... H03L 7/00
[52] U.S. Cl. ............................ 327/143; 327/146; 327/198
[58] Field of Search ................................... 327/143, 142, 327/198, 150, 159, 156, 146

[56] References Cited

U.S. PATENT DOCUMENTS

| | | | |
|---|---|---|---|
| 5,237,213 | 8/1993 | Tanoi | 307/290 |
| 5,369,311 | 11/1994 | Wang et al. | 327/143 |
| 5,712,584 | 1/1998 | McClure | 327/143 |
| 5,889,709 | 3/1999 | Fukuda | 337/143 |

*Primary Examiner*—Jung Ho Kim
*Attorney, Agent, or Firm*—Fleshner & Kim, LLP

[57] ABSTRACT

A power noise preventing circuit for a microcontroller unit (MCU) is provided that prevents an erroneous operation of the MCU caused by power supply noise. The power noise preventing circuit for the MCU can include a power fail detecting circuit that controls a power fail signal by comparing supplied power to a preset fail voltage of a MCU and a system clock generating circuit that receives a clock signal and generates a first system clock signal that determines a state of a system. A clock freezing and synchronizing circuit fixedly outputs a second system clock signal at a state of the first system clock signal when the power falls below the preset fail voltage and the power fail signal is enabled. The clock freezing and synchronizing circuit further outputs the second system clock signal synchronized with the first system clock signal when the power fail signal is disabled.

19 Claims, 4 Drawing Sheets

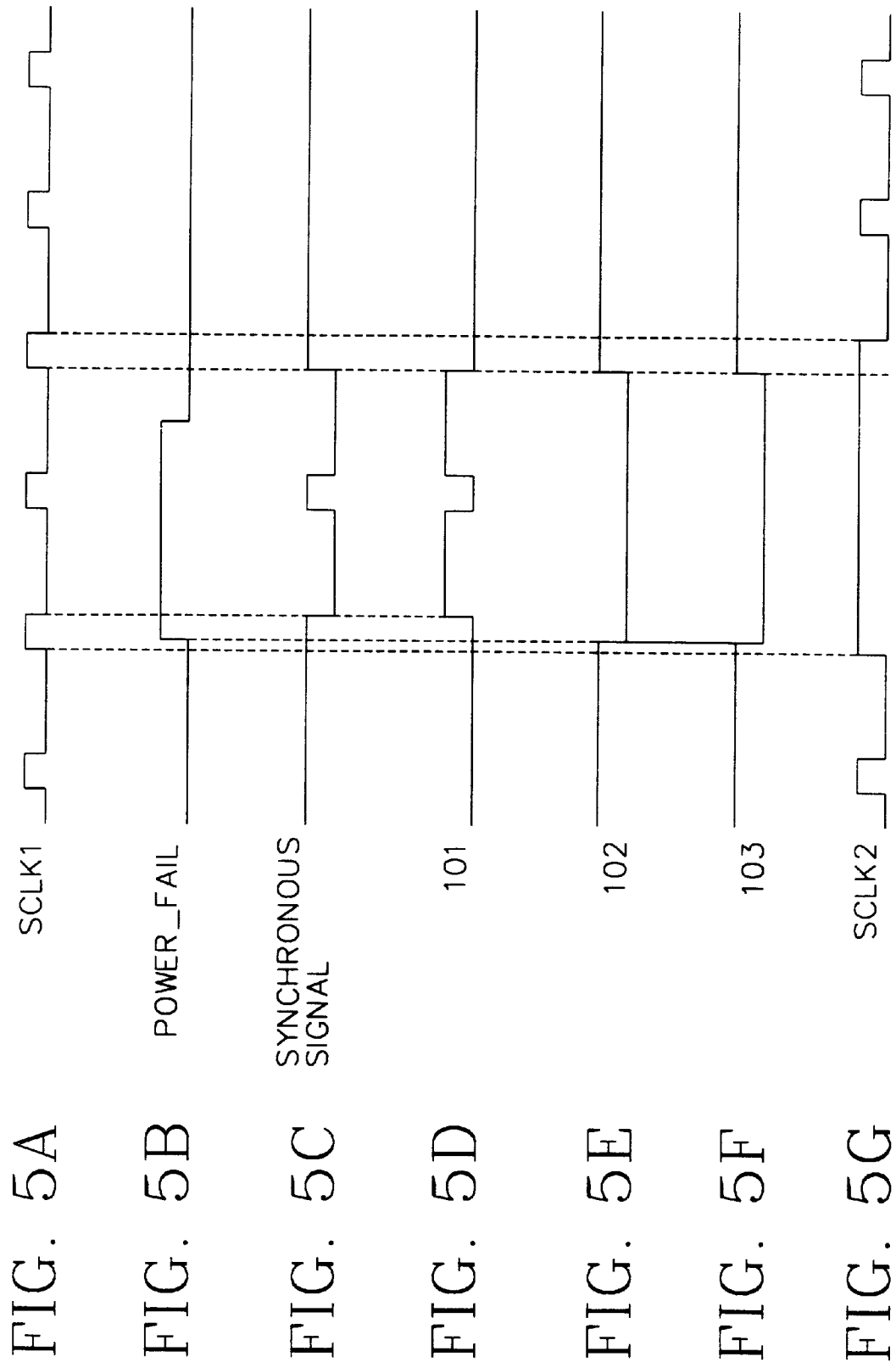

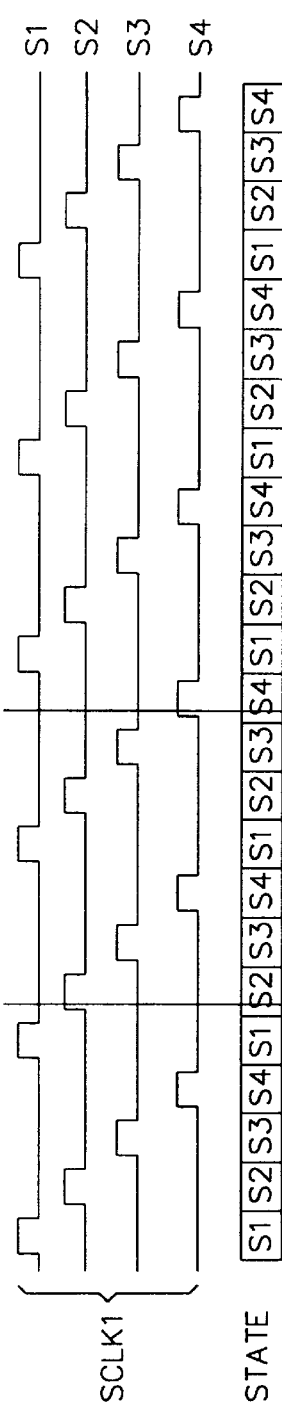
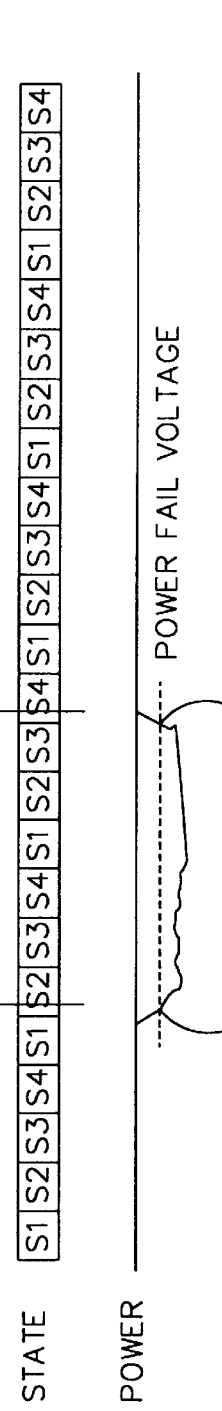
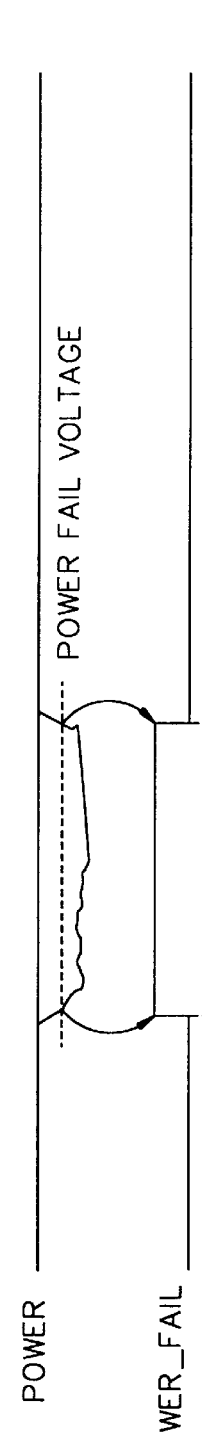
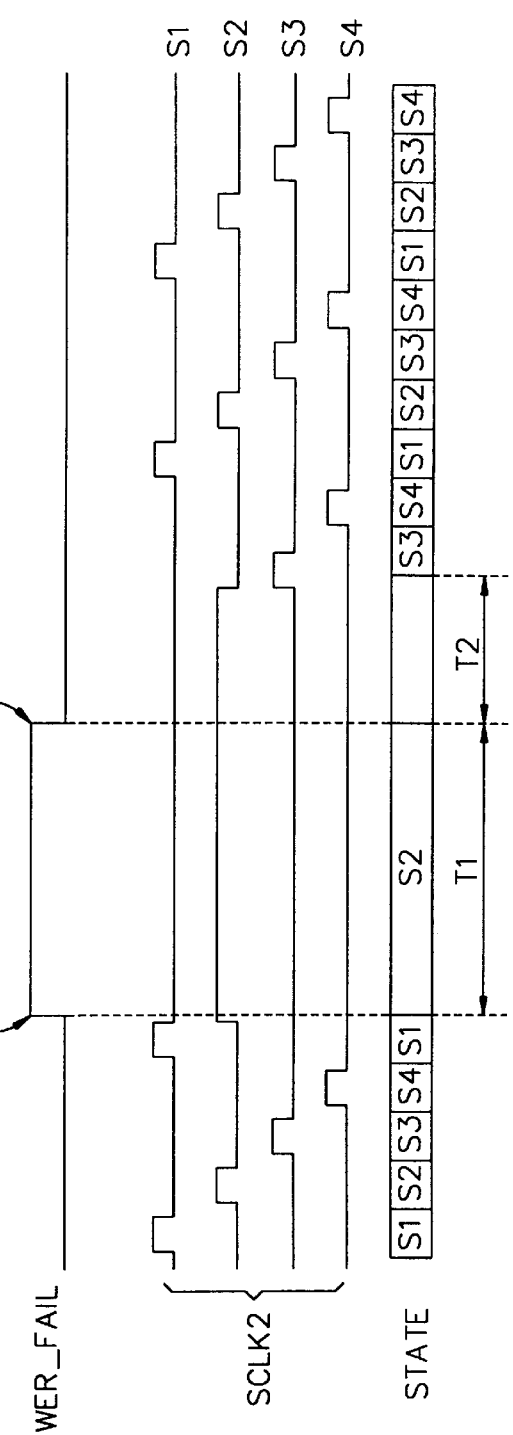
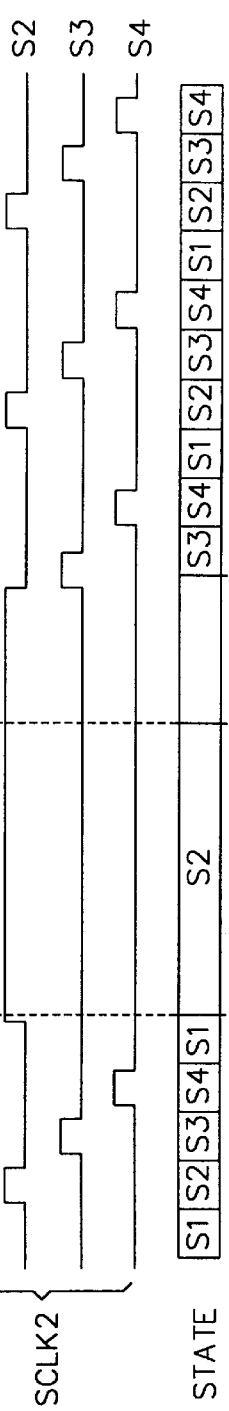
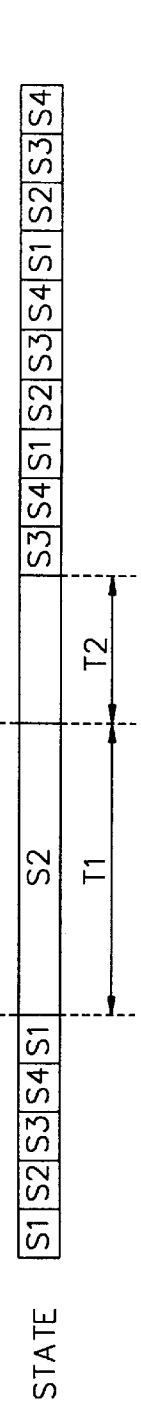

POWER NOISE PREVENTING CIRCUIT FOR MICROCONTROLLER UNIT (MCU)

BACKGROUND OF THE INVENTION

1. Field of the Invention

The present invention relates to a microcontroller unit (MCU), and more particularly to a power noise preventing circuit for a MCU.

2. Discussion of the Background

Preventing an erroneous operation due to noise is one of the basic requirements of many systems. A microcontroller unit (MCU) is an integrated circuit with the least resistance to noise, and accordingly, preventing power noise is more seriously required.

FIG. 1 is a block diagram of a related art power noise preventing circuit for the MCU. The related art power noise preventing circuit for the MCU includes a power fail detecting circuit 10 for enabling a power fail signal Power_Fail when power is changed to a voltage with which the MCU is not able to operate. The related art power noise preventing circuit for the MCU further includes a resetting circuit 20. The resetting circuit 20 resets the MCU in accordance with the enabled power fail signal.

When power is changed to the voltage at which the MCU does not operate, e.g., when the power noise is received, the power fail detecting circuit 10 enables the power fail signal Power_Fail. The resetting circuit 20 resets the MCU in accordance with the enabled power fail signal Power_Fail to prevent the erroneous operation of the MCU caused by the noise. Meanwhile, a system clock generating circuit 30, as shown in FIG. 2, receives a basic clock signal ICLK from an oscillator and generates a system clock signal SCLK, which is needed for an internal circuit.

However, the system clock generating circuit 30 continuously outputs the system clock signal SCLK to the internal circuit even though the power noise is inputted to the MCU. Accordingly, an erroneous operation of the system can occur when the power fails. In addition, when the erroneous operation of the system is caused by the power fail, it is difficult or impossible for the system to return to a normal state. Therefore, the MCU is unconditionally reset when the power noise is inputted.

As described above, the related art power noise preventing circuit has various disadvantages. When the MCU is reset, the system using the MCU also is reset to an initial state. For example, when the MCU is reset, a TV is turned off, a washing machine stops operating and returns to an initial state, or a medical appliance that is being operated is suspended. As a result, the related art power noise preventing circuit for the MCU may result in a dangerous situation because of a sudden operational failure of appliances. Additionally, when restarting the operation of the MCU and the system using the MCU in the initial state or in a suspended state, various related systems should be restarted or reset, thus causing inconvenience.

The above references are incorporated by reference herein where appropriate for appropriate teachings of additional or alternative details, features and/or technical background.

SUMMARY OF THE INVENTION

An object of the present invention is to substantially obviates at least the problems or disadvantages of the related art.

Another object of the present invention is to prevent erroneous operation of a MCU.

Another object of the present invention is to prevent an erroneous operation caused by a power source noise.

Another object of the present invention is to temporarily suspend an internal status while a power noise is inputted to a system.

To achieve at least the above objects and other advantages in a whole or in parts and in accordance with the purpose of the present invention, as embodied and broadly described, a power noise preventing circuit includes a power fail detecting circuit that controls a power fail signal based on a power level and a prescribed level, a clock generating circuit that receives a clock signal and generates a first clock signal and a clock freezing and synchronizing circuit that receives the power fail signal and the first clock signal and outputs a second clock signal maintained at a state of the first clock signal when the power fail signal is enabled and outputs the second clock signal synchronized with the first clock signal when the power fail signal is disabled.

To further achieve the above objects and other advantages in a whole or in parts and in accordance with the purpose of the present invention, as embodied and broadly described, a power noise preventing circuit for a MCU includes a power fail detecting circuit that enables a power fail signal when power falls below a prescribed fail voltage of the MCU and disables the power fail signal when the power is not less than the prescribed power fail voltage; a system clock generating circuit that receives a clock signal and generates a first system clock signal having a plurality of states that determine a state of a system; and a clock freezing and synchronizing circuit that receives the first system clock signal and the power fail signal and fixedly outputs a second system clock signal at a state of the first system clock signal when the power fail signal is enabled and outputs the second system clock signal synchronized with the first clock signal when the power fail signal is disabled, wherein the clock freezing and synchronizing circuit has a first latch reset by the power fail signal, a plurality of second latches that latch the first system clock signal based on an output from the first latch and outputs the second system clock signal, and a logic circuit that logically processes the outputs from the first and second clock signals and the power fail signal to reset the first latch.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 5A–5G are diagrams showing timing waveforms of the clock freezing and synchronizing circuit of FIG. 3; and FIGS. 6A–6F are diagrams showing timing waveforms of each unit in FIG. 3.

DETAILED DESCRIPTION OF THE INVENTION

Figure 1:
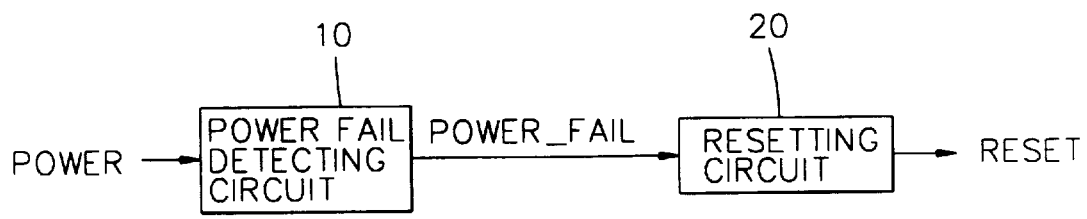
FIG. 1 is a block diagram showing a related art power noise preventing circuit for a MCU.
Figure 2:
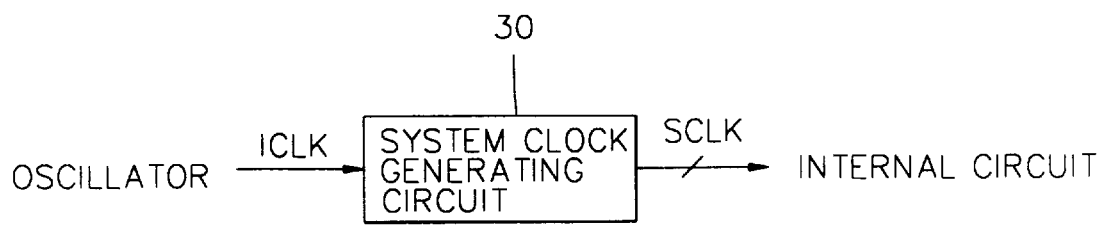
FIG. 2 is a block diagram showing a related art system clock circuit for FIG. 1.
Figure 3:
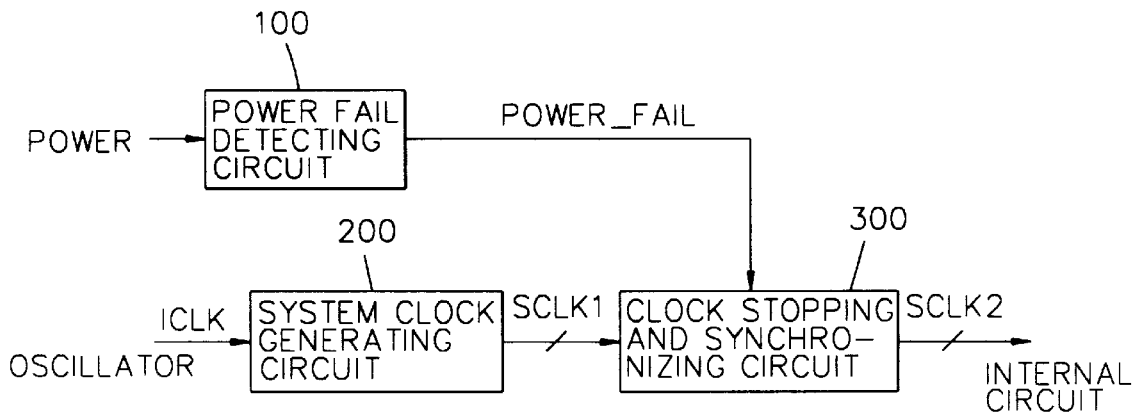
FIG. 3 is a block diagram showing a preferred embodiment of a power noise preventing circuit for a MCU according to the present invention.

FIG. 3 is a block diagram showing a preferred embodiment of a power noise preventing circuit for a MCU according to the present invention. As shown in FIG. 3, the preferred embodiment of the power noise preventing circuit includes a power fail detecting circuit 100, a system clock generating circuit 200 and a clock stopping and synchronizing circuit 300.

The power fail detecting circuit 100 activates a power fail signal Power_Fail when supplied power changes to a voltage with which the MCU cannot operate. The power fail detecting circuit 100 may be preferably embodied as a low voltage detecting circuit or a high voltage detecting circuit.

The system clock generating circuit 200 receives a clock signal ICLK from an oscillator. The system clock generating circuit 200 generates a first system clock signal SCLK1, which is the internal system signal that is used to determine a state of the system. The clock stopping and synchronizing circuit 300 receives the first system clock signal SCLK1 from the system clock generating circuit 200, and outputs a second system clock signal SCLK2 to the internal circuit based on the power fail signal Power_Fail from the power fail detecting circuit 100.

Figure 4:
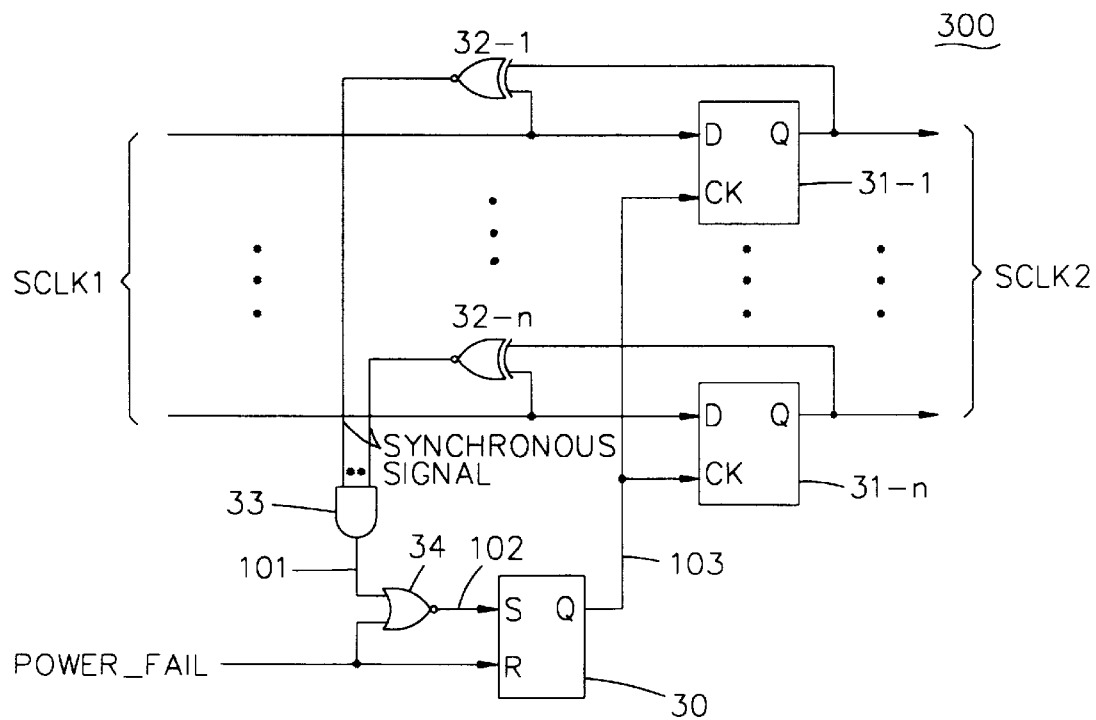
FIG. 4 is a diagram showing a clock freezing and synchronizing circuit in FIG. 3.

FIG. 4 is a diagram showing the clock stopping and synchronizing circuit 300. As shown in FIG. 4, the clock stopping and synchronizing circuit 300 includes a set and reset flip-flop (SR F/F) or a latch 30 reset by the power fail signal Power_Fail and a plurality of delay flip-flops (D F/Fs) or latches 31-1 to 31-n for latching the first system clock signal SCLK1 in accordance with an output from the SR latch 30 and outputting the second system clock signal SCLK2. A plurality of exclusive NOR gates 32-1 to 32-n compare the first system clock signal SCLK1 and the second system clock signal SCLK2 and output a synchronous signal. A NAND gate 33 for NANDS outputs from the exclusive NOR gates 32-1 to 32-n, and a NOR gate 34 sets the SR latch 30 by NORing an output from the NAND gate 33 and the power fail signal Power_Fail.

With reference to FIGS. 5–6, operations of the preferred embodiment of the power noise preventing circuit for the MCU will now be described. The system clock generating circuit 200 receives the basic clock signal ICLK from the oscillator and generates the first system clock signal SCLK1, which determines the state of the system at regular intervals. In particular, when the first system clock signal SCLK1, which has four states S1–S4 as shown in FIG. 6A, is generated in the system clock generating circuit 200, the first system clock signal SCLK1 repeats the states of S1, S2, S3, and S4 shown in FIG. 6B.

When power is changed below a power fail voltage that is previously established, the power fail detecting circuit 100 enables the power fail signal Power_Fail as shown in FIG. 6D. As shown in FIG. 6C, the power failure voltage of the MCU is a prescribed voltage level with which the MCU cannot operate.

Therefore, as shown in FIG. 6E, in accordance with the enabled power fail signal Power_Fail, the clock stopping and synchronizing circuit 300 continuously outputs the second system clock signal SCLK2 at the moment power fails as the first system clock signal SCLK1 regardless of the state of the first system clock signal SCLK1. Thus, the state of the second system clock signal SCLK2 is fixed at the state of S2 during an abnormal operation interval T1 as shown in FIG. 6F.

That is, when the power fail signal Power_Fail is enabled as shown in FIG. 5B, the SR latch 30 is reset, and an output signal 103 of the SR latch 30 is disabled as shown in FIG. 5F. Thus, the D latches 31-1 to 31-n latch an output Q in accordance with the disabled output signal 103. Accordingly, although the first system clock signal SCLK1 continues to be supplied at regular intervals as shown in FIG. 5A, the second system clock signal SCLK2 outputted from the D latches 31-1 to 31-n is fixed at the state when the power failed as shown in FIG. 5G.

However, as shown in FIG. 6F, there is a possibility that each circuit in the MCU temporarily enters an abnormal state in the abnormal operation interval T1 in which power is failed. Although each circuit in the MCU becomes the abnormal state in the abnormal operation interval T1, power returns to a normal state in a normal operation interval T2. Thus, the clock stopping and synchronizing circuit 300 preferably resumes the normal state and outputs the second system clock signal SCLK2 synchronized with the first system clock signal SCLK1 from the state of S3.

That is, when the power returns to the normal state, the power fail signal Power_Fail is disabled, and the exclusive NOR gates 32-1 to 32-n compare outputs from the first system clock signal SCLK1 and from the D latches 31-1 to 31-n. The D latches 31-1 to 31n enable the synchronous signal shown in FIG. 5C when the two signals, the first and second system clock signals, SCLK1, SCLK2, are identical.

As shown in FIGS. 5D and 5E, an output 101 from the NAND gate 33 becomes a low level and an output 102 from the NOR gate 34 becomes a high level in accordance with the enabled synchronous signal. Thus, the SR latch 30 is set by the output 102 at the high level, and the output 103 is enabled.

Accordingly, the D latches 31-1 to 31-n output the second system clock signal SCLK2 synchronized with the first system clock signal SCLK1 based on the output 103 enabled in the SR latch 30. Thus, the normal system clock signal is again supplied to the internal circuit or the like.

As described above, the preferred embodiment of the power noise preventing circuit according to the present invention has various advantages. When the power noise is instantaneously inputted to a system applying the MCU, the preferred embodiment of the power noise preventing circuit for the MCU temporarily suspends the internal status of the system without turning the MCU off or setting the system at an initial state. In addition, the preferred embodiment of the power noise preventing circuit restarts the system operation from the moment the internal status is suspended. Thus, restarting or resetting the system is not required and dangerous situations caused by a sudden operational failure of appliances can be avoided or reduced.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power noise preventing circuit, comprising:
   a power fail detecting circuit that controls a power fail signal based on a power level and a prescribed level;
   a clock generating circuit that receives a clock signal and generates a first clock signal; and an error preventing circuit that receives the power fail signal and the first clock signal and outputs a second clock signal maintained at a state of the first clock signal when the power fail signal is enabled and outputs the second clock signal synchronized with the first clock signal when the power fail signal is disabled, wherein the first and second clocks sequence through a prescribed number of states, wherein the error preventing circuit freezes a state of the second clock signal at a current state of the first clock signal when the power fail signal is enabled until the power fail signal is disabled and the first clock signal becomes a next state.

2. The circuit of claim 1, wherein the prescribed level is a fail voltage of a microcontroller unit.

3. The circuit of claim 1, wherein the power detecting circuit enables the power fail signal when the power level is below the prescribed level and disables the power fail signal when the power level is above the prescribed level.

4. The circuit of claim of claim 1, wherein the first clock signal determines a state of a system.

5. The circuit of claim 1, wherein the error preventing circuit comprises:
   a first latch reset by the power fail signal;
   a plurality of second latches that latch the first clock signal based on an output from the first latch and output the second clock signal;
   a plurality of logic gates that logically process the first clock signal and the second clock signal;
   a first logic circuit that logically processes outputs from the logic gates; and
   a second logic circuit that logically processes an output from the first logic circuit and the power fail signal to set the first latch.

6. The circuit of claim 5, wherein the first latch is a SR latch and each of the plurality of second latches is a D latch.

7. The circuit of claim 5, wherein the first and second logic circuits are respectively first and second logic-gates.

8. The circuit of claim 7, wherein the first logic-gate is a NAND gate and the second gate is a NOR gate, and wherein each of the plurality of logic-gates are exclusive NOR gates.

9. The circuit of claim 5, wherein the plurality of second latches output a synchronous signal.

10. The circuit of claim 1, wherein the power fail detecting circuit is at least one of a low voltage detecting circuit and a high voltage detecting circuit, and wherein the second clock signal is for an internal circuit.

11. A power noise preventing circuit for a microcontroller unit (MCU), comprising:
   a power fail detecting circuit that enables a power fail signal when power falls below a prescribed fail voltage of the MCU and disables the power fail signal when the power is not less than the prescribed power fail voltage;
   a system clock generating circuit that receives a clock signal and generates a first system clock signal having a plurality of states that determine a state of a system; and
   an error preventing circuit that receives the first system clock signal and the power fail signal and fixedly outputs a second system clock signal at a state of the first system clock signal when the power fail signal is enabled and outputs the second system clock signal synchronized with the first clock signal when the power fail signal is disabled, wherein the error preventing circuit comprises,
   a first latch reset by the power fail signal,
   a plurality of second latches that latch the first system clock signal based on an output from the first latch and outputs the second system clock signal, and
   a logic circuit that logically processes the outputs from the first and second clock signals and the power fail signal to reset the first latch.

12. The circuit of claim 11, wherein the logic circuit comprises:
   a plurality of logic gates that logically process the first clock signal and the second clock signal;
   a first logic circuit that logically processes outputs from the logic gates; and
   a second logic circuit that logically processes an output from the first logic circuit and the power fail signal to set the first latch.

13. The circuit of claim 12, wherein the first logic circuit is: a NAND gate that NANDs the outputs from exclusive NOR gates; and the second logic circuit is a NOR gate that NORs an output from the NAND gate and the power fail signal to reset the first latch.

14. The circuit of claim 11, wherein the first and second clocks sequence through a prescribed number of states, wherein the error preventing circuit freezes a state of the second clock signal at a current state of the first clock signal when the power fail signal is enabled until the power fail signal is disabled and the first clock signal becomes a next state.

15. A noise preventing circuit, comprising:
   a power fail detecting circuit that controls a power fail signal based on a power level and a prescribed level;
   a clock generating circuit that generates a first clock signal; and
   an error preventing circuit that receives the power fail signal and the first clock signal and outputs a second clock signal maintained at a state of the first clock signal when the power fail signal is enabled and outputs the second clock signal synchronized with the first clock signal when the power fail signal is disabled, wherein the error preventing circuit comprises,
   a first latch reset by the power fail signal,
   a plurality of second latches that latch the first clock signal based on an output from the first latch and output the second clock signal, and
   a logic circuit that logically process the first clock signal, the second clock signal and the power fail signal to set the first latch.

16. The circuit of claim 15, wherein the logic circuit comprises:
   a plurality of logic gates that logically process the first clock signal and the second clock signal;
   a first logic circuit that logically processes outputs from the logic gates; and
   a second logic circuit that logically processes an output from the first logic circuit and the power fail signal to set the first latch.

17. The circuit of claim 16, wherein the first latch is a SR latch and each of the plurality of second latches is a D latch, wherein the first and second logic circuits are respectively first and second logic-gates, and wherein the first logic-gate is a NAND gate and the second gate is a NOR gate, and wherein each of the plurality of logic-gates are exclusive NOR gates.

18. The circuit of claim 15, wherein the first and second clocks sequence through a prescribed number of states, wherein the error preventing circuit freezes a state of the second clock signal at a current state of the first clock signal when the power fail signal is enabled until the power fail signal is disabled and the first clock signal becomes a next state.

19. The circuit of claim 15, wherein the power fail detecting circuit is at least one of a low voltage detecting circuit and a high voltage detecting circuit, and wherein the first and second clock signals are internal clock signals.

* * * * *